United States Patent
Guo et al.

(10) Patent No.: US 9,718,922 B2
(45) Date of Patent: Aug. 1, 2017

(54) POLYMERIZATION ENHANCED BY NANOSTRUCTURES UNDER X-RAY IRRADIATION

(71) Applicant: The Regents of the University of California, Oakland, CA (US)

(72) Inventors: Ting Guo, Davis, CA (US); R. Andrew Davidson, Davis, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

(21) Appl. No.: 14/436,785

(22) PCT Filed: Oct. 25, 2013

(86) PCT No.: PCT/US2013/066905
§ 371 (c)(1),
(2) Date: Apr. 17, 2015

(87) PCT Pub. No.: WO2014/066814
PCT Pub. Date: May 1, 2014

(65) Prior Publication Data
US 2016/0200872 A1 Jul. 14, 2016

Related U.S. Application Data

(60) Provisional application No. 61/718,627, filed on Oct. 25, 2012.

(51) Int. Cl.
| | | |
|---|---|---|
| C08F 2/46 | (2006.01) | |
| C08F 2/50 | (2006.01) | |
| C08G 61/04 | (2006.01) | |
| C08G 73/02 | (2006.01) | |
| C08F 2/54 | (2006.01) | |
| C08F 2/44 | (2006.01) | |

(52) U.S. Cl.
CPC ............ *C08G 73/0266* (2013.01); *C08F 2/44* (2013.01); *C08F 2/54* (2013.01)

(58) Field of Classification Search
CPC .......... C08F 2/54; C08F 2/44; C08G 73/0266; C08G 73/02
USPC ................. 522/66, 6, 1, 71, 189, 184; 520/1
See application file for complete search history.

(56) References Cited

U.S. PATENT DOCUMENTS

| | | | | |
|---|---|---|---|---|
| 7,274,035 B2* | 9/2007 | Yang | ...................... | B82Y 10/00 257/27 |
| 2011/0031450 A1* | 2/2011 | Park | ...................... | B22F 1/0018 252/513 |
| 2011/0240556 A1* | 10/2011 | Hoek | ................. | B01D 67/0011 210/650 |
| 2012/0128996 A1 | 5/2012 | Kwon et al. | | |
| 2012/0132930 A1* | 5/2012 | Young | ................. | H01L 31/0481 257/84 |

FOREIGN PATENT DOCUMENTS

WO 2014/066814 A1 5/2014

OTHER PUBLICATIONS

Scienfitic basis for the definition of "nanomaterial", Dec. 8, 2010, pp. 1-46.*
Alexander et al., "Tunable SERS in Gold Nanorod Dimers through Strain Control on an Elastomeric Substrate," Nano Lett., 2010, vol. 10, pp. 4488-4493, DOI: 10.1021/nl1023172.
Baibarac et al., "SERS spectra of polyaniline thin films deposited on rough Ag, Au and Cu. Polymer film thickness and roughness parameter dependence of SERS spectra," Synthetic Metals, 1998, vol. 96, pp. 63-70.
Belloni et al., "Radiation chemistry of nanocolloids and clusters," Elsevier Science B.V., C.D. Jonah and B.S.M. Rao (Editors), Radiation Chemistry: Present Status and Future Trends, 2001 pp. 411-452.
Benfield, Robert E., "Mean Coordination Numbers and the Non-metal-Metal Transition in Clusters," J. Chem. Soc. Faraday Trans., 1992, vol. 88, Issue 8, pp. 1107-1110.
Billman et al., "Charge Transfer Between Adsorbed Cyanide and Silver Probed by SERS," Surface Science, 1984, vol. 138, pp. 1-25.
Blinova et al., "The oxidation of aniline with silver nitrate to polyaniline-silver composites," Polymer, 2009, vol. 50, pp. 50-56, doi:10.1016/j.polymer.2008.10.040.
Carter et al., "Enhanced single strand breaks of supercoiled DNA in a matrix of gold nanotubes under X-ray irradiation," Journal of Colloid and Interface Science, 2012, vol. 378, pp. 70-76.
Carter et al., "Nanoscale Energy Deposition by X-ray Absorbing Nanostructures," J. Phys. Chem. B, 2007, vol. 111, No. 40, pp. 11622-11625.
Cheng et al., "Chemical Enhancement by Nanomaterials under X-ray Irradiation," J. Am. Chem. Soc. 2012, vol. 134, pp. 1950-1953, dx.doi.org/10.1021/ja210239k.
Cleland et al., "X-ray initiated polymerization of wood impregnants," Radiation Physics and Chemistry, 2009, vol. 78, pp. 535-538.
Collinson et al., "The Polymerization of Acrylamide in Aqueous Solution," published on Jan. 1, 1957, Dept. of Physical Chemistry, The University, Leeds, 2, 13 pages.

(Continued)

Primary Examiner — Jessica E Whiteley
(74) Attorney, Agent, or Firm — Kilpatrick Townsend & Stockton LLP

(57) ABSTRACT

The methods disclosed herein are directed to methods of enhancing formation of a polymer from a monomer on a metal-based nanoparticle under X-ray irradiation and compositions produced by such methods. The method comprises irradiating a monomer solution with X-rays to form the polymer; wherein the monomer solution comprises the monomer, the metal-based nanoparticle, and a solvent capable of generating a hydroxyl radical; and wherein the metal-based nanoparticle is a particle having a greatest dimension between 5 and 100 nanometers. The methods also include the dissolution metal ions from these same metal-based nanoparticles wherein the solution comprises the metal-based nanoparticle and a solvent capable of generating a hydroxyl radical; and wherein the metal-based nanoparticle is a particle having a greatest dimension between 5 and 100 nanometers.

9 Claims, 7 Drawing Sheets

(56) References Cited

OTHER PUBLICATIONS

Cristescu et al., "PANi—TiO$_2$ nanostructures for fuel cell and sensor applications," Journal of Optoelectronics and Advanced Materials, vol. 10, No. 11, Nov. 2008, p. 2985-2987, vol. 10, No. 11, pp. 2985-2987.

Dair et al., "The Effect of Substrate Material on Silver Nanoparticle Antimicrobial Efficacy," Journal of Nanoscience Nanotechnology, 2010, vol. 10, No. 12, pp. 8456-8462.

Dong et al., "Study of the surface-enhanced Raman spectroscopy of residual impurities in hydroxylamine-reduced silver colloid and the effects of anions on the colloid activity," Spectrochimica Acta Part A, 2012, vol. 88, pp. 97-101.

El Omar et al, "Time-Dependent Radiolytic Yield of OH˙ Radical Studied by Picosecond Pulse Radiolysis," J. Phys. Chem. A, 2011, vol. 115, pp. 12212-12216, dx.doi.org/10.1021/jp208075v.

Elzey et al., "Agglomeration, isolation and dissolution of commercially manufactured silver nanoparticles in aqueous environments," J. Nanopart. Res., Jun. 2010, vol. 12, Issue 5, pp. 1945-1958, doi:10.1007/s11051-009-9783-y.

Felix et al., "X-ray irradiation: A non-conventional route for the synthesis of conducting polymers," Synthetic Metals, 2011, vol. 161, p. 173-176.

Foley et al., "Enhanced relaxation of nanoparticle-bound supercoiled DNA in X-ray radiation," Chem. Commun., 2005, pp. 3192-3194.

Freunscht et al., "Surface-enhanced Raman spectroscopy of trans-stilbene adsorbed on platinum- or self-assembled monolayer-modified silver film over nanosphere surfaces," Chemical Physics Letters, 1997, vol. 281, pp. 372-378.

Gaeta et al., "High-power collimated laser-plasma source for proximity x-ray nanolithography," J. Vac. Sci. Technol. B, Jan./Feb. 2003, vol. 21, No. 1, pp. 280-287, doi: 10.1116/1.1539070.

Gao et al., "Surface-Enhanced Raman Spectroscopy as a Probe of Electroorganic Reaction Pathways. 2. Ring-Coupling Mechanisms during Aniline Oxidation," The Journal of Physical Chemistry, 1989, vol. 93, No. 9, pp. 3753-3760.

Huang et al., "A General Chemical Route to Polyaniline Nanofibers," J. Am. Chem. Soc., 2004, vol. 126, pp. 851-855.

Jones et al., "Estimation of microscopic dose enhancement factor around gold nanoparticles by Monte Carlo calculations," Med. Phys . . . , Jul. 2010, vol. 37, No. 7, Jul. 2010, pp. 3809-3816, 10.1118/1.3455703.

Jones et al., "First principles calculations and experimental insight into methane steam reforming over transition metal catalysts," Journal of Catalysis, 2008, vol. 259, pp. 147-160.

Kittler et al., "Toxicity of Silver Nanoparticles Increases during Storage Because of Slow Dissolution under Release of Silver Ions," Chem. Mater., 2010, vol. 22, pp. 548-4554, DOI:10.1021/cm100023p.

Kumar et al., "Hot Spots in Ag Core-Au Shell Nanoparticles Potent for Surface-Enhanced Raman Scattering Studies of Biomolecules," J. Phys. Chem. C, 2007, vol. 111, No. 11, pp. 4388-4392.

Kuzyk et al., "A Model for X-Ray-Induced Solid-state Polymerization," Journal of Polymer Science: Part B: Polymer Physics, 1988, vol. 26, pp. 277-287.

Lee et al., "Gamma radiation induced distribution of gold nanoparticles into carbon nanotube-polyaniline composite," Composites Science and Technology, 2007, vol. 67, pp. 811-816.

Lee et al., "Geometry Enhancement of Nanoscale Energy Deposition by X-rays," J. Phys. Chem. C, 2012, vol. 116, pp. 11292-11297, dx.doi.org/10.1021/jp210301q.

Mallick et al., "Polymerization of Aniline by Auric Acid: Formation of Gold Decorated Polyaniline Nanoballs," Macromol. Rapid Commun., 2005, vol. 26, pp. 232-235, DOI: 10.1002/marc.200400513.

Merga et al., "Naked" Gold Nanoparticles: Synthesis, Characterization, Catalytic Hydrogen Evolution, and SERS, J. Phys. Chem. C, 2010, vol. 114, pp. 14811-14818.

Nowicka et al., "Hydroxyl Radicals Attack Metallic Gold," Angew. Chem., 2010, vol. 122, pp. 1079-1081, DOI: 10.1002/ange.200906358.

Peng et al., "Micelle-Assisted One-Pot Synthesis of Water-Soluble Polyaniline-Gold Composite Particles," Langmuir, 2006, vol. 22, No. 26, pp. 10915-10918.

Qi et al., "Adsorption of aniline on silver mirror studied by surface-enhanced Raman scattering spectroscopy and density functional theory calculations," J. Raman Spectrosc., 2011, vol. 42, pp. 1287-1293.

Qu et al., "Probing Site Activity of Monodisperse Pt Nanoparticle Catalysts Using Steam Reforming of Methane," J. Phys. Chem. Lett., 2010, vol. 1, pp. 254-259, DOI: 10.1021/jz900098x.

Toyota et al., "Technique for 25 nm x-ray nanolithography," J. Vac. Sci. Technol. B, Nov./Dec. 2001, vol. 19, No. 6, pp. 2428-2433, doi: 10.1116/1.1415503.

Tseng et al., "Charge transfer effect in the polyaniline-gold nanoparticle memory system," Appl. Phys. Lett., 2007, vol. 90, 053101, 4 pages; http://dx.doi.org/10.1063/1.2434167.

Tseng et al , "Controlled hydrogel photopolymerization inside live systems by X-ray irradiation," Soft Matter, 2012, vol. 8, pp. 1420-1427, DOI: 10.1039/c1sm06682j.

Wolszczak et al., "Effect of Ionizing Radiation on Polyaniline Solutions," Radial. Phys. Chem., 1996, vol. 47, No. 6, pp. 859-867.

Zhou et al., "Controlled synthesis and quantum-size effect in gold-coated nanoparticles," 1994, vol. 50, No. 16, pp. 12053-12057.

\* cited by examiner

POLYMERIZATION ENHANCED BY NANOSTRUCTURES UNDER X-RAY IRRADIATION

CROSS-REFERENCE TO RELATED APPLICATIONS

The present application is a national stage application under 35 US.C. 371 of PCT/US2013/066905, filed Oct. 25, 2013, which claims priority to U.S. Provisional Application No. 61/718,627, filed Oct. 25, 2012, each of which is incorporated herein by reference in its entirety.

STATEMENT REGARDING FEDERALLY-SPONSORED RESEARCH

This invention was made with government support under grant CHE-0957413 awarded by the National Science Foundation (NSF). The government has certain rights in the invention.

FIELD OF THE INVENTION

The present disclosure relates generally to methods of enhancing formation of a polymer from a monomer on a metal-based nanoparticle under X-ray irradiation or the dissolution of metal ions from this nanoparticle under X-ray irradiation, and more specifically to methods of enhancing formation of a polyaniline polymer from an aniline monomer on a silver core-gold shell nanoparticle under X-ray irradiation and release of Ag ions from this core-shell nanoparticle. The present disclosure also relates to compositions produced by the methods of the present disclosure.

BACKGROUND

Nanomaterials possess unique properties such as the quantum confinement effect, large surface-to-volume atom ratio, enhanced catalytic activities, tunable plasmonic responses to light, and more recently demonstrated property of enhanced absorption of X-rays and increased energy deposition density from X-ray absorption (Zhou H S et al., *Phys. Rev. B* 1994, 50, 12052-12056; Benfield R E., *J. Chem. Soc. Faraday T.* 1992, 88, 1107-1110; Jones G et al., *J. Catal.* 2008, 259, 147-160; Qu Y et al., *J. Phys. Chem. Lett.* 2010, 1, 254-259; Freunscht P et al., *Chem. Phys. Lett.* 1997, 281, 372-378; Alexander K et al., *Nano Lett.* 2010, 10, 4488-4493; Carter J D et al., *J. Phys. Chem. B* 2007, 111, 11622-11625; Lee C et al., *J. Phys. Chem. C* 2012, 116, 11292-11297; Cho S et al., *Med. Phys.* 2010, 37, 3809-3816). Chemical enhancement of X-ray effect by nanomaterials under X-ray irradiation has been demonstrated recently using gold nanoparticles under X-ray irradiation (Cheng N N et al., *J. Am. Chem. Soc. Commun.* 2012, 134, 1950-1953). The discovery of chemical enhancement by nanostructures as a result of the interaction of nanomaterials with X-ray generated reactive oxygen species (ROS) may greatly improve the ability of X-rays to form or break chemical bonds. This new property may impact many new applications such as activation of nano scale reaction mechanisms in the body, causing explosions in enclosed volumes, charging batteries at high rates, or converting ionizing radiation energy to chemical energy. This new research area is called X-ray Nanochemistry.

Several examples of chemical enhancement have been demonstrated in the literature, which include enhanced yield of DNA cleavage and reactions to form fluorescent molecules (Carter J D et al., *J. Phys. Chem. B* 2007, 111, 11622-11625; Foley E et al., *Chem. Commun.* 2005, 3192-3194; Carter J D et al., *J. Colloid Interf. Sci.* 2012, 378, 70-76). Since polymerization may be initiated using various means including X-rays, it is natural to consider nanomaterials may enhance such a process. It would be a significant scientific and technological advancement if a small dose of X-rays can trigger the growth of polymers, especially at remote and not easily accessible locations by light, or in an environment difficult to deliver large amounts of chemical initiators. One such place is tissue in the body (Tseng S J et al., *Soft Matter* 2012, 8, 1420-1427). Other potential applications include X-ray nanoscale lithography (Gaeta C J et al., *J. Vac. Sci. & Technol. B.* 2003, 21, 280-287; Toyota E et al., *J. Vac. Sci. & Technol. B.* 2001, 19, 2428-2433).

X-ray induced polymerization in the bulk has been widely studied (Collinson E et al., *T. Faraday Soc,* 1957, 53, 476-488; Kuzyk M G et al., *J. Polym. Sci. Poly. Phys.* 1988, 26, 277-287; Cleland M R et al., *Rad. Phys. Chem.* 2009, 78, 535-538). For example, Lee et al. and Blinova et al. studied formation of nanoparticles from Ag ions under X-ray irradiation (Blinova N V et al., *Polymer* 2009, 50, 50-56; Lee K P et al., *Compos. Sci. Technol.* 2007, 67, 811-816), a process investigated broadly by many groups in the last two decades (Belloni J et al., *Radiation Chemistry: Present Status and Future Trends;* 1st ed.; Jonah, C. D., Rao, B. S. M., Eds.; Elsevier Science, 2001; Vol. 87; pp 411-452). Merga et al. used p-aminothiolphenol (ATP) to probe the effect of X-rays on SERS substrate of gold nanoparticles (AuNPs) (Merga G et al., *J. Phys. Chem. C.* 2010, 114, 14811-14818). In another study, Felix et al. used X-rays to produce polyaniline (PANI) in aqueous solution (Felix J F et al., *Synthetic Metals* 2011, 161, 173-176). However, no conclusions have been drawn as to whether nanomaterials under X-rays enhance polymerization, partially due to (1) strong spontaneous growth of polymers in the presence of these nanomaterials such as AuNPs even without X-rays and (2) low sensitivity of SERS by AuNPs.

If polymer formation is enhanced by nanomaterials, then the growth process should occur on the surface of nanomaterials and the polymers so grown should be surface bound. SERS hence should be an ideal tool to probe polymer formation on the surface, as long as the polymers have intense SERS spectra. PANI is a good system for several reasons. First, it is SERS active. Second, PANI is an important polymer because it is one of a few conductive polymers (Cristescu C et al., *J. Optoelectron. Adv. M.* 2008, 10, 2985-2987). For example, PANI memory systems have been studied by Tseng et al (Tseng R J et al., *Appl. Phys. Lett.* 2007, 90). Third, PANI formation was investigated using SERS by Gao el al (Gao P et al., *J. Phys. Chem.* 1989, 93, 3753-3760), and its complex SERS spectra carry rich information of the type of PANI and SERS substrate. Baibarac et al. and Dong et al. investigated different forms of PANI deposited on different SERS substrates (Baibarac M et al., *Synthetic Met.* 1998, 96, 63-70; Dong X et al., *Spectrochim. Acta A* 2012, 88, 97-101). Theoretical studies such as DFT calculations were performed by Qi et al. (Qi Y et al., *J. Raman Spectrosc.* 2011, 42, 1287-1293). These investigations provide the knowledge basis for data analysis and mechanistic explanations even without X-rays and low sensitivity of SERS by AuNPs.

SUMMARY

The present disclosure provides a nanoparticle-based method of enhancing formation of a polymer under X-ray irradiation, the method comprising:

irradiating a monomer solution with X-rays to form the polymer;

wherein the monomer solution comprises the monomer, a metal-based nanoparticle, and a solvent capable of generating a hydroxyl radical;

and wherein the metal-based nanoparticle is a particle having a greatest dimension between 5 and 100 nanometers. In some embodiments, the polymer is a polyaniline polymer and the monomer is an aniline monomer. In other embodiments, the aniline monomer comprises an alkane-aniline or a dianiline monomer. In other embodiments, the metal-based nanoparticle comprises a metal selected from the group consisting of Ag, Au, Cu, Co, Ni, Fe, Pd, and combinations thereof. In other embodiments the metal-based nanoparticle comprises a core and a shell. In other embodiments, the core comprises Ag. In other embodiments, the shell comprises Au. In other embodiments, the metal-based nanoparticle comprises two or more nanoparticles having a conductive interface capable of electron transfer. In other embodiments, one of the two or more nanoparticles comprises Ag. In other embodiments, one of the two or more nanoparticles comprises Au. In other embodiments, the monomer concentration required to form a quantity of the polymer in the presence of the metal-based nanoparticles is less than the monomer concentration required to form substantially the same quantity of the polymer in the absence of the metal-based nanoparticles under substantially the same reaction conditions. In other embodiments, the solvent is an aqueous solvent.

The present disclosure further provides a nanomaterial composition comprising a metal-based nanoparticle and a polyaniline polymer, wherein the polyaniline polymer is adsorbed to the surface of the metal-based nanoparticle, and wherein the metal-based nanoparticle is a particle having a greatest dimension between 5 and 100 nanometers. In some embodiments, the metal-based nanoparticle comprises a metal selected from the group consisting of Ag, Au, Cu, Co, Ni, Fe, Pd, and combinations thereof. In some embodiments, the metal-based nanoparticle comprises a core and a shell. In some embodiments, the core comprises Ag. In some embodiments, the shell nanoparticle comprises Au. In some embodiments, the polyaniline polymer is an emeraldine salt or an emeraldine base. In some embodiments, the polyaniline polymer is an emeraldine base. In some embodiments, the metal-based nanoparticle comprises at least one nanoparticle comprising a first metal and at least one nanoparticle comprising a second metal. In some embodiments, the first metal is Ag and the second metal is Au. In some embodiments, the polyaniline polymer is a poly-alkane-aniline or a poly-dianiline polymer.

The present disclosure further provides a nanoparticle-based method of enhancing dissolution of metal ions from a metal-based nanoparticle under X-ray irradiation, the method comprising:

irradiating a solution with X-rays to dissolve the metal ions;

wherein the solution comprises the metal-based nanoparticle and a solvent capable of generating a hydroxyl radical;

and wherein the metal-based nanoparticle is a particle having a greatest dimension between 5 and 100 nanometers. In some embodiments, the metal-based nanoparticle comprises a metal selected from the group consisting of Ag, Au, Cu, Co, Ni, Fe, Pd, and combinations thereof. In some embodiments, the metal-based nanoparticle comprises a core and a shell. In some embodiments, the core comprises Ag. In some embodiments, the shell comprises Au. In some embodiments, the metal-based nanoparticle comprises two or more nanoparticles having a conductive interface capable of electron transfer. In some embodiments, one of the two or more nanoparticles comprises Ag. In some embodiments, one of the two or more nanoparticles comprises Au.

DESCRIPTION OF THE FIGURES

FIG. 3B shows SERS spectrum of PANI made in water under X-ray irradiation without NCSs, and PANI is considered to be ES because the Raman peak at the peak at 1451 $cm^{-1}$.

DETAILED DESCRIPTION

The following description presents the results of the first experimental study of the enhancement of polymerization of aniline enhanced by silver core-gold shell nanocoreshells (Ag@Au NCSs) under X-ray irradiation. The NCSs afford both high SERS sensitivity and minimal spontaneous formation of PANI without X-rays.

Figure 1:
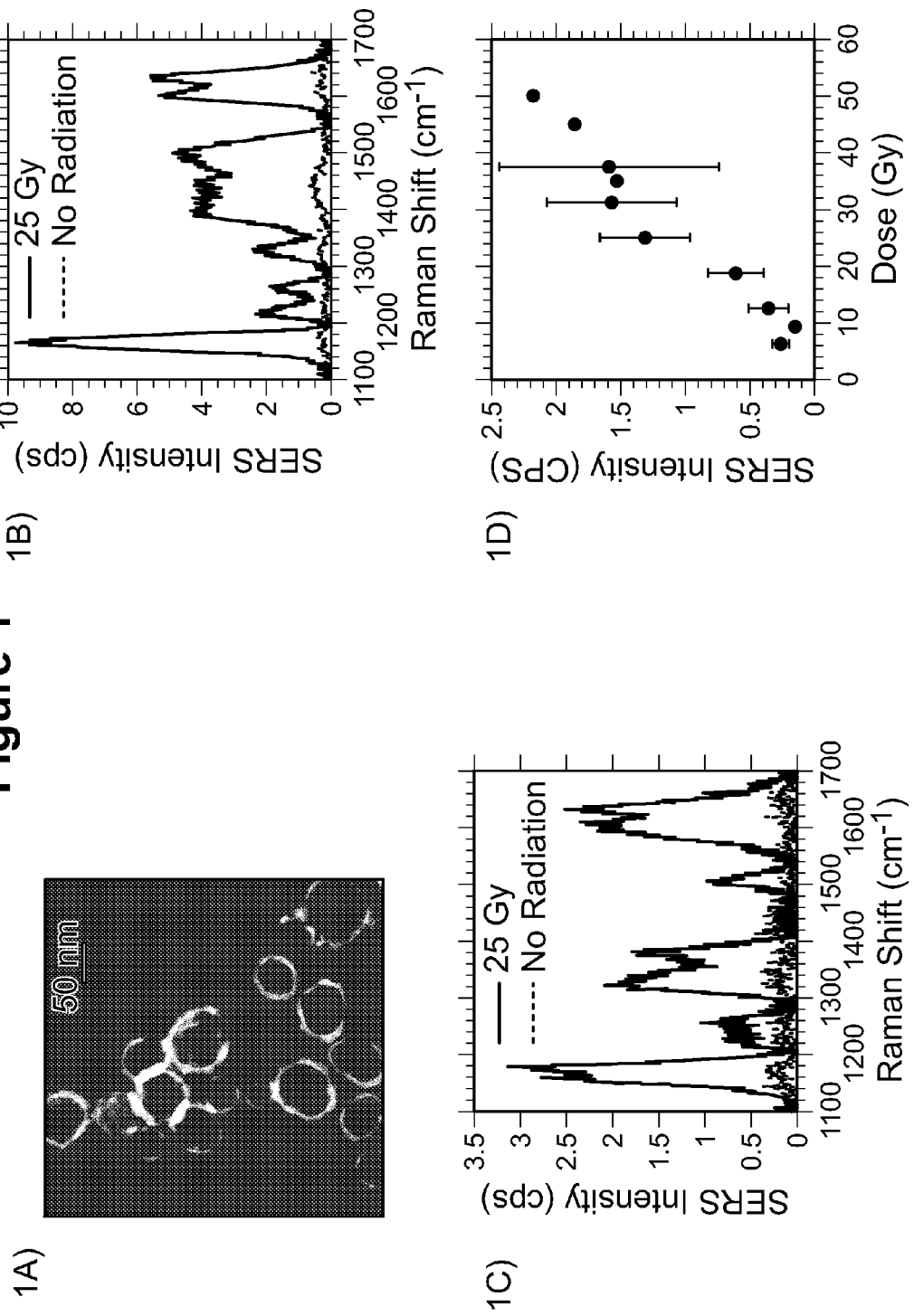
FIG. 1. 1A shows the dark-field STEM image of NCSs. The scale bar is 50 nm. 1B and 1C show SERS spectra of dialyzed and as-synthesized NCSs in 0.1 mM aniline aqueous solution with (solid black lines) and without (dashed grey lines) X-ray irradiation. 1D shows the SERS signal intensity of PANI on dialyzed NCSs as a function of X-ray dose at 2.5 Gy/min.

FIG. 1A shows a dark-field scanning transmission electron microscopy (STEM) image of the dialyzed NCSs. The NCSs are clean and free of any small nanoparticles. Upon irradiation with X-rays (100 kVp) in the presence of only 0.1 mM aniline monomers, PANI formed and was subsequently probed with SERS. At this monomer concentration under X-ray irradiation, little PANI formed in bulk solution (away from the surface of NCSs), as confirmed by SERS measurements of remixing freshly dialyzed NCSs with the supernatant after separation of the X-ray irradiated aniline-NCSs solution via centrifugation. For 0.1 mM aniline and 4-nM NCSs, we estimated <1 monolayer of aniline on the surface of NCSs if aniline is uniformly deposited on NCSs, which partially explains the observed results.

FIG. 1B shows a typical SERS spectrum (solid black line) of PANI from 0.1 mM aniline in dialyzed NCSs aqueous solution irradiated with 25-Gy X-rays at 2.5 Gy/min dose rate. This dose rate was used throughout this work unless otherwise noted. Also shown is a SERS spectrum of PANI formed spontaneously from monomers mixed with dialyzed NCSs without X-ray irradiation (dashed grey line). The intensity of SERS signal detected here was used to quantitatively assess the amount of PANI, and the enhancement of PANI formation on NCSs due to X-ray irradiation is >10 times using the ratio of the integrated intensities of peaks of these two samples in the 1285-1550 cm$^{-1}$ region. Although higher enhancements may be obtained using peaks of these two signals at a certain specific Raman peak, the integrated method is chosen because it is less biased by potential charge transfers between PANI and NCSs that may result in peak shift (Billman J et al., *Surf Sci.* 1984, 138, 1-25).

The rate of PANI formation from aniline in water under X-ray irradiation without NCSs was much lower, for it required 10 mM monomers and 125 Gy to produce PANI of the same SERS signal strength as from 0.1 mM aniline and 25-Gy X-rays with NCSs. If first-order rate laws apply here, then NCS under X-rays increased the yield by 400 times over X-ray irradiated aniline aqueous solution without NCSs using the signal integrated in the 1285 to 1550 cm$^{-1}$ region.

The enhancement was found to be a function of X-ray (100 kVp) dose rate: at 0.6 Gy/min the enhancement was 28.0 times (data not shown). The enhancement only changed mildly, less than 20%, as the X-ray tube voltage was varied between 50 and 100 kVp and with the use of a Tin foil (0.25 mm thick) to modify the X-ray spectrum. Future experiments using monochromatic X-ray sources at synchrotrons may be necessary to completely unravel the subtle dependency of enhancement on X-ray energy.

FIG. 1C shows SERS spectra of PANI formed from as-synthesized NCSs in 0.1 mM aniline aqueous solution, both with (solid black line) and without (dashed grey line) X-ray irradiation. The SERS pattern is different from the dialyzed NCSs. The enhancement is lower, at approximately 6 times.

Figure 2:
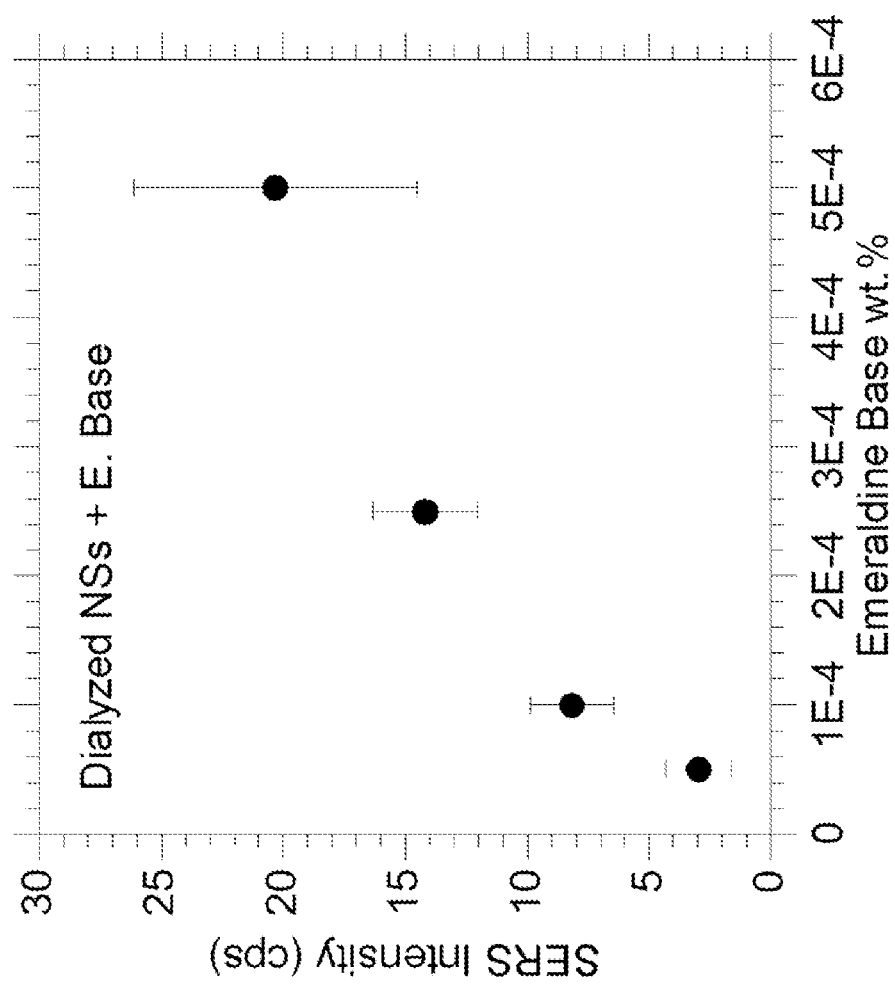
FIG. 2. SERS signal intensity as a function of EB concentration. The signal is linear for concentration below $1\times10^{-4}$ wt %, which corresponds to 0.1 mM aniline monomer concentration.

To prove that SERS can be used to measure the amount of PANI and to quantitatively estimate the enhancement, FIG. 1D shows the peak intensity of PANI SERS in the 1285 to 1550 cm$^{-1}$ using dialyzed NCSs under X-ray irradiation as a function of X-ray dose, and approximate linearity is observed within the specified dose range. This linearity and a similar linearity observed between SERS signal intensity and PANI concentration in solution (for SERS signal intensity up to 10 cps as shown in FIG. 2) suggest that SERS probe can be used to quantitatively estimate the amount of PANI and hence enhancement.

Figure 3:
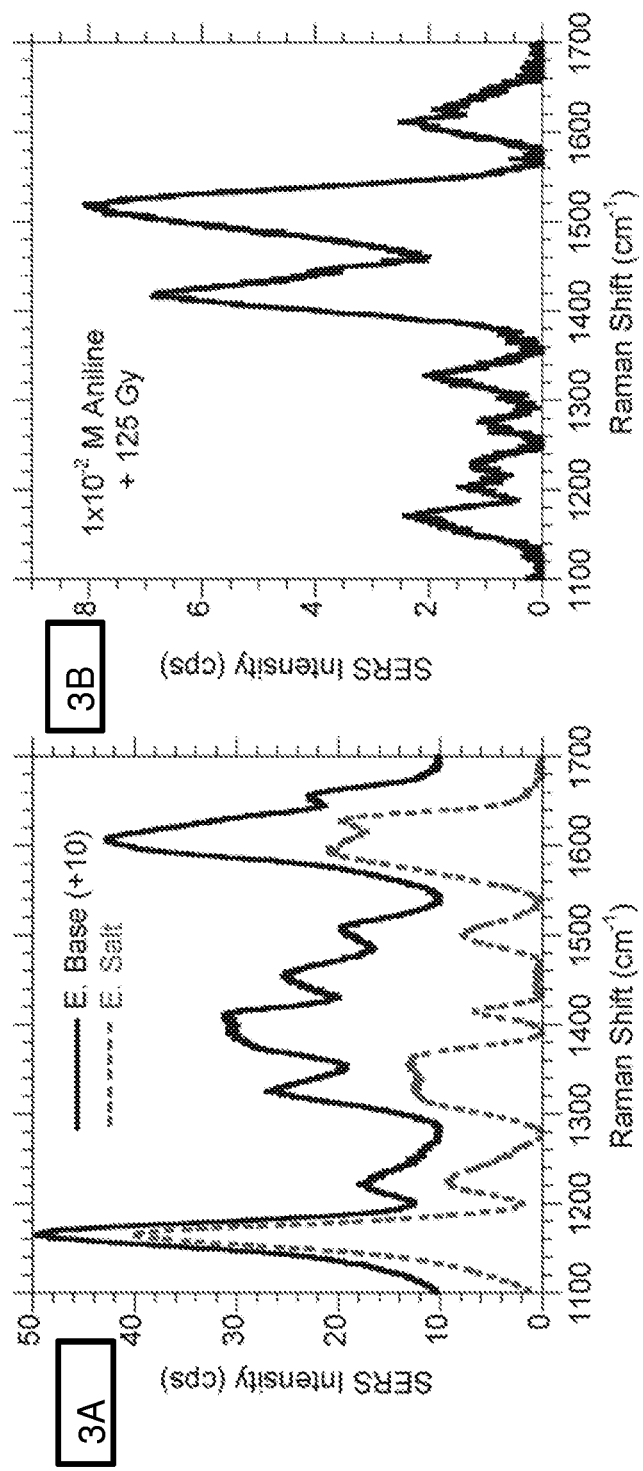
FIG. 3. SERS spectra of two PANI, emeraldine salt (ES) and emeraldine base (EB) made in solution (FIG. 3A) (Jones G et al., *J. Catal.* 2008, 259, 147-160). The ratio of peaks at 1417 and 1451 $cm^{-1}$ is used to determine the type of PANI. Base the intensity of signal at these positions and using the spectra obtained by Baltog et al. as the reference, PANI formed on dialyzed NCSs is determined to be EB on Au substrate (Qu Y et al., *J. Phys. Chem. Lett.* 2010, 1, 254-259).

Two forms of PANI, emeraldine salt (ES) and emeraldine base (EB) made in solution were examined with SERS (spectra shown in FIG. 3A) (Huang J X et al., *J. Am. Chem. Soc.* 2004, 126, 851-855). The ratio of peaks at 1417 and 1451 cm$^{-1}$ was used to determine the type of PANI. Based on SERS profiles and using the spectra obtained by Baibarac et al. as a reference, PANI formed on dialyzed NCSs was determined to be EB on Au substrate (Baibarac M et al., *Synthetic Met.* 1998, 96, 63-70). SERS spectrum of PANI made in water under X-ray irradiation without NCSs was also obtained (FIG. 3B).

Dialysis removes free ions and other compounds in NCSs after synthesis, but it has been reported that Ag ionic species may slowly depart Ag nanoparticles in solution over time (Kittler S et al., *Chem. Mat.* 2010, 22, 4548-4554). However, immediately after dialysis the solution had a limited amount of ionic species, as verified by STEM inspections, the amount of PANI, and atomic absorption (AA) measurements. AA measurements showed free Ag and Au ions and small nanoparticles in dialyzed NCSs between 0.1 (detection limit) to 0.25 ppm Au or Ag in the supernatant after centrifugation separation of dialyzed NCSs. Taking into consideration that 10 min of 5000 rpm centrifugation could not pull down small nanoparticles (e.g., <2 nm) in water, the amount of free ions in the dialyzed NCS solutions should be less than the measured 0.1 ppm Au or 0.25 ppm Ag ions, which correspond to 0.6 µM Au ions or 2.3 µM Ag ions.

Figure 4:
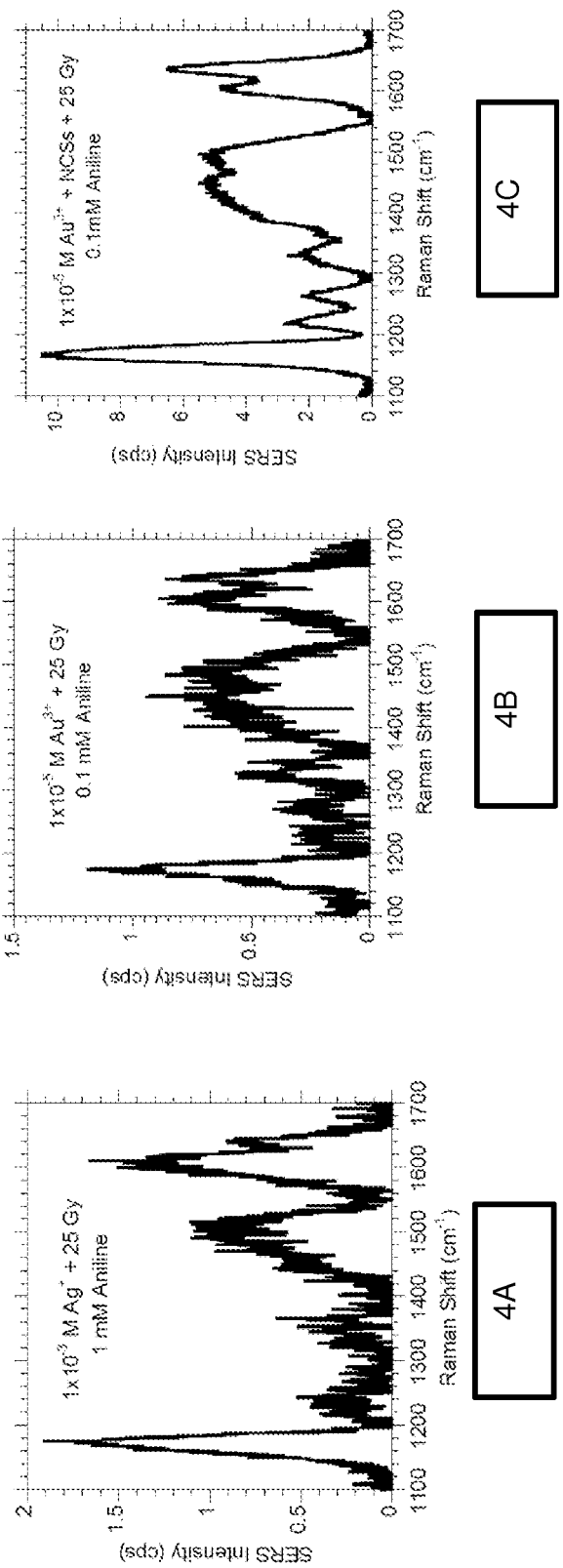
FIG. 4. SERS signals for X-ray irradiated solutions with different Ag or Au ion and aniline concentrations. Even with 10 μM $Au^{3+}$ ions, the signal is only 10% of that with 4 nM NCSs.

To further investigate the formation mechanisms and the origin of the unique SERS profile for dialyzed NCSs, we tested PANI formation in solutions of Ag and Au ions mixed with aniline and dialyzed NCSs. Base on NCSs SERS measurements, no additional PANI formation with up to 1 µM Au and Ag ions added to aniline and irradiated with 25-Gy X-rays. Without X-ray irradiation, 1 mM Ag$^+$ and 1 mM aniline (FIG. 4A) and 10 µM of Au$^{3+}$ and 0.1 mM aniline (FIG. 4B) (both incubated for 18 hours) yielded a small amount of PANI similar to that produced with dialyzed NCSs and 0.1 mM shown in FIG. 1B (dashed grey line), proving free ions along cannot cause PANI formation.

Figure 5:
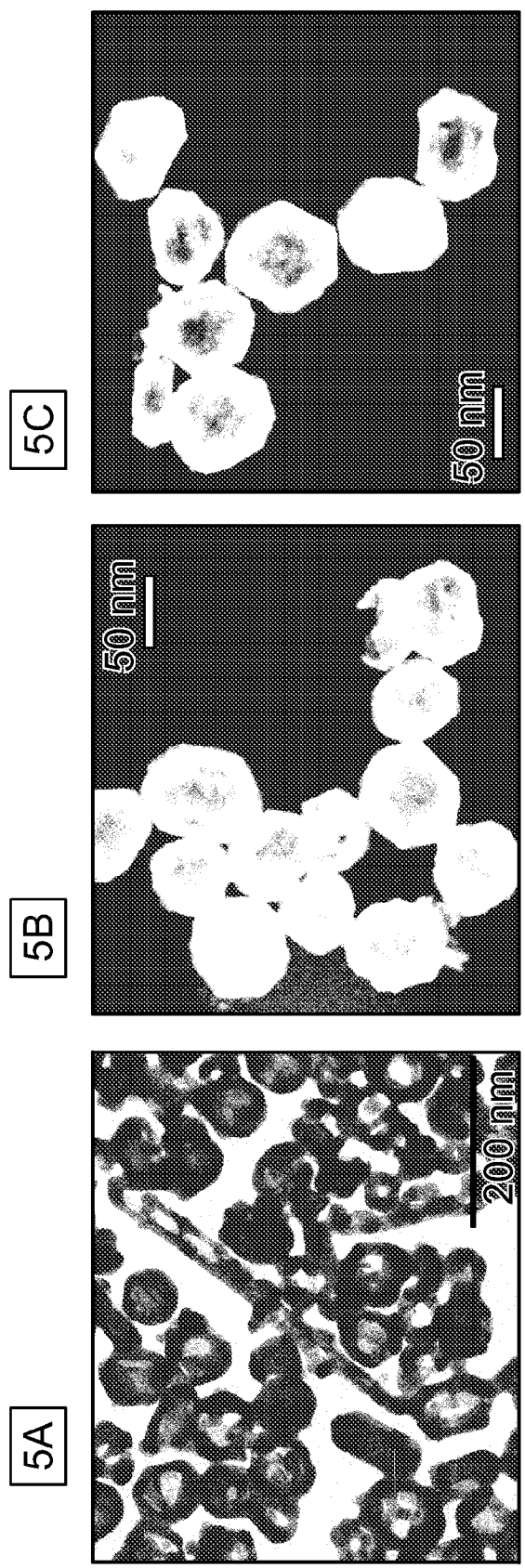
FIG. 5. 5A shows a TEM image of X-ray irradiated (450 Gy) NCSs. Many NCSs are hollow after irradiation. 5B shows an STEM image of NCSs in aniline after 25-Gy X-rays, and 5C shows the same with 10 mM DMSO added to the solution.

Au/Ag in NCSs may be oxidized by ROS species produced from X-rays irradiation of water. Typically 2.7 µM accumulated OH radicals (.OH) are generated after a 10-Gy X-ray exposure, although instant ROS concentrations are extremely low (~pM) (El Omar A K et al., *J. Phys. Chem. A.* 2011, 115, 12212-12216). Hence it is possible to assume that individual ROS react with NCSs at low X-ray dose rate (~1 Gy/min). FIG. 5A shows a TEM image of NCSs irradiated with 450-Gy X-rays without aniline. The Ag cores were clearly etched away by radiation, and sharp Au edges were smoothened, which can only be caused by oxidative .OH reacting with NCSs. The release of Ag ions are similar to what have been reported in the literature using .OH smoothing rough Au surfaces (Nowicka A M et al., *Angew. Chem. Int. Edit.* 2010, 49, 1061-1063). In the presence of X-rays or monomers, these ions may be reduced to form nanoparticles. Indeed, small nanoparticles were detected even after low-dose irradiation of NCSs in the presence of aniline, as shown in FIG. 5B, which is a high resolution STEM image of NCSs irradiated with 25-Gy X-rays in 0.1 mM aniline. The contrast of the image was increased to show the small nanoparticles around NCSs. Testing was done by adding .OH scavengers to stop the growth of PANI and the release of ions from NCSs. Dimethylsulfoxide (DMSO), an .OH scavenger, was used and PANI formation was significantly reduced to below the SERS detection limit. FIG. 5C shows an STEM dark-field image of NCSs in monomers with 10 mM DMSO under 25-Gy X-ray irradiation, showing no small nanoparticles. This confirmed that .OH was responsible for the creation of the species that promoted polymer formation on NCS surface. To test the role of the surface of nanoparticles, silica nanoparticles were employed and no PANI formation was detected after 25-Gy X-ray irradiation.

Figure 6:
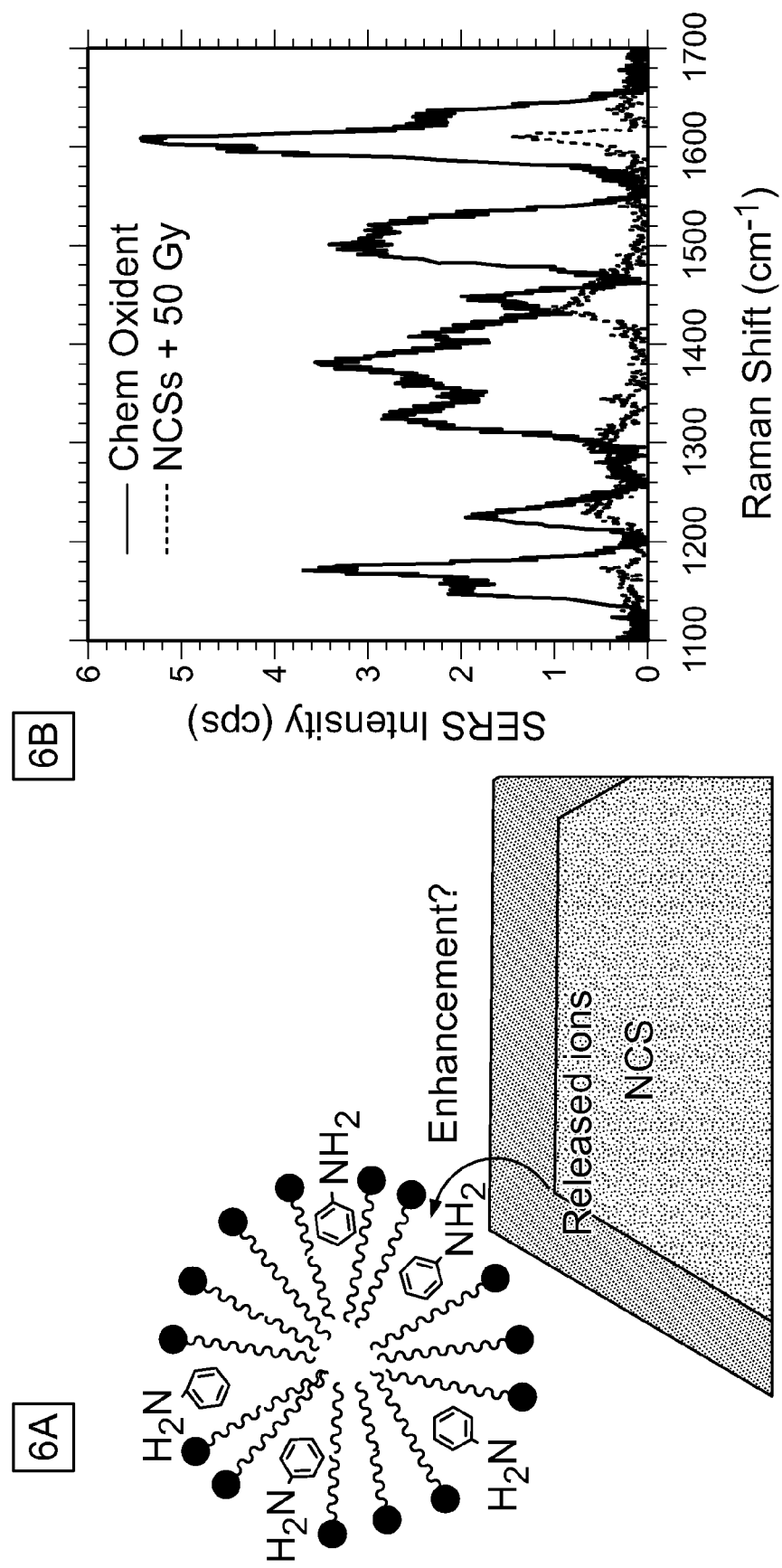
FIG. 6. 6A shows the micelle experimental design in which micelles were used to isolate the surface from the monomers. If ions can leave NCSs and initiate polymerization alone, then SERS signal should be seen. 6B shows the results. Little PANI formed under X-ray irradiation. This shows that NCS surface is needed for PANI formation even under X-ray irradiation.

These results suggest that PANI growth occurs on the surface of NCSs during X-ray irradiation, and little polymers are grown in bulk solution at low aniline concentrations (≤1 mM). To further test the role of surface and the role of Ag ionic species, micelles were employed to isolate the contact between SERS substrate and monomers. FIG. 6A shows the schematic of the experiment, and FIG. 6B shows the result of using micelles and a chemical oxidizer to help form PANI in micelles without X-rays. If PANI formation does not rely on the surface, but merely Ag ionic species, then PANI should form when NCSs are irradiated with X-rays because it results in Ag ions leaving NCSs. In the case of micelle/NCSs irradiated with X-rays, growth stopped, suggesting that the surface of NCSs, in addition to ionic species, is a critical component to the growth of polymers.

These observed enhancements are unlikely caused by enhanced X-ray absorption by NCSs for the following reasons. First, theoretical calculations using a package created in this lab show that direct absorption of X-ray by NCSs at the concentrations used here (~4 nM) is less than 7% of that by the surrounding water in which ROS are generated. This means that type 1 physical enhancement (T1PE) or average enhancement is negligible (Lee C et al., *J. Phys. Chem. C* 2012, 116, 11292-11297; Cheng N N et al., *J. Am. Chem. Soc. Commun.* 2012, 134, 1950-1953). Even considering the nanoscale energy deposition enhancement or type 2 physical enhancement (T2PE), the amount of enhancement over water within a nanoscale volume is less than 9 times for the size of 60 nm NCSs, which is much less than the observed 400-time enhancement observed here (Lee C et al., *J. Phys. Chem. C* 2012, 116, 11292-11297). Secondly, the SERS pattern for PANI grown from NCS s/aniline solution is different from that of PANI produced from aniline under irradiation and then probed with NCSs, as shown in FIGS. 1B and 3B. Third, adding DMSO almost completely stopped PANI formation; proving that the .OH reacting with AuNPs are not generated locally from NCSs but from surrounding water. Lastly, the enhancement is a function of dose rate, which cannot be readily explained with X-ray absorption enhancement. As a result, the observed enhancement was considered to be mainly caused by some type of chemical enhancement similar to that reported by Cheng et al. (Cheng N N et al., J. Am. Chem. Soc. Commun. 2012, 134, 1950-1953).

Figure 7:
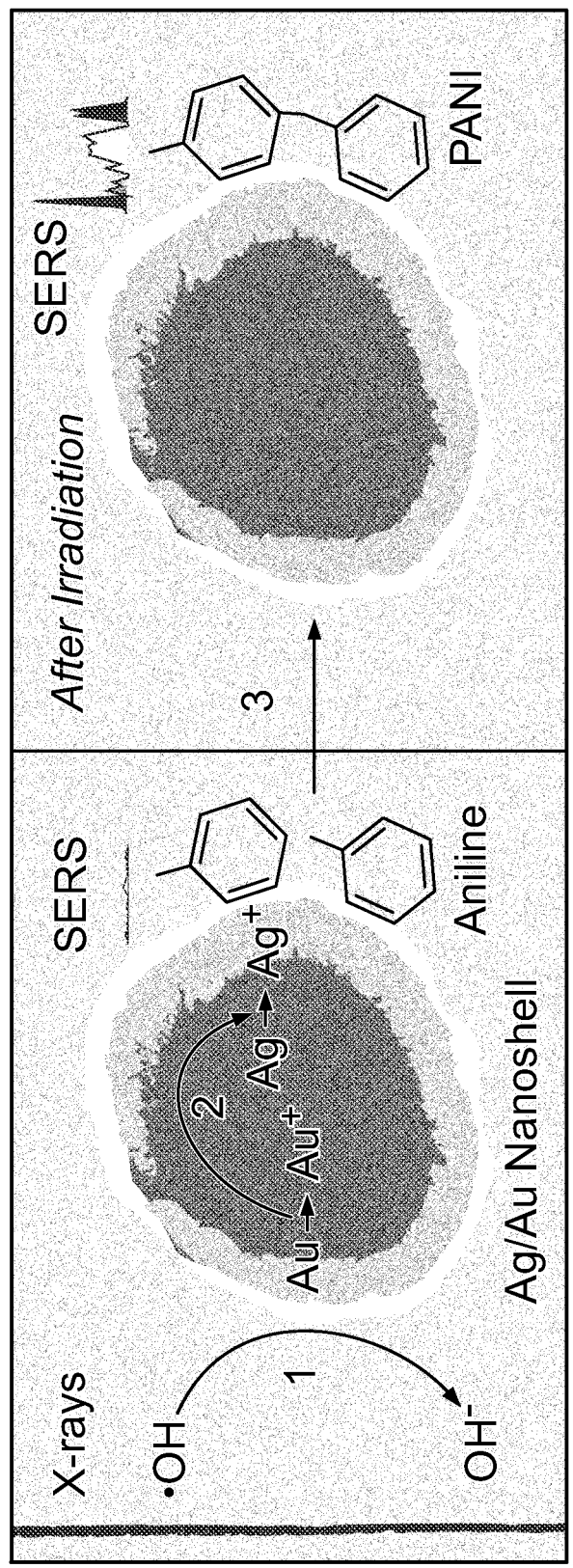
FIG. 7. Without being bound by any theory, the FIG. 7 shows a schematic of the proposed mechanism. Step 1 shows the X-ray generated ROS oxidizing Au surface. Step 2 suggests Au ions galvanically oxidize Ag. Step 3 indicates polymerization enabled by either Au or Ag ions.

FIG. 7 shows a schematic of proposed chemical enhancement processes. Without wishing to be bound by theory, it is thought that ROS such as .OH created by X-ray irradiation of water help oxidize NCSs, creating positive charges on the surface, first on Au as it dominates the surface (Step 1 in FIG. 7). These positive charges then migrate to Ag sites due to the galvanic effect (Step 2). Without monomers, Ag ions may leave NCSs as shown in FIG. 5A; with monomers, especially when there are monomers are already physically adsorbed on the surface near the hot spots for SERS, both Au and Ag cationic species can promote polymer formation (Step 3). This is a new type of chemical enhancement of nanostructures enhancing the effect of X-rays, taking advantage of the scavenging property of these NCSs toward .OH and the galvanic process between Au and Ag in NCSs. Although a .OH can directly react with an aniline molecule deposited on NCSs, it is much easier that the whole NCS gets oxidized by the .OH to enable polymerization.

The proposed sequence shown in FIG. 7 also favors low dose rate of X-rays so that .OH can react with NCSs without the interference from reducing ROS such as solvated electrons ($e^-_{aq}$) and superoxides. At higher dose rates, oxidation and reduction are more likely to happen simultaneously, working against each other and canceling the effect. This is clearly shown in the dose rate dependency results, showing 0.6 Gy/min resulting in almost 3 times the enhancement obtained at 2.5 Gy/min. Once formed, PANI can only change form, but not be destructed by reducing radicals such as superoxides.

The spontaneous PANI formation in the presence of NCSs can be explained by the residual ionic species (not free ions) left after nanomaterial synthesis. Such spontaneous PANI formation was observed in many forms of nanomaterials with persistent spontaneous polymerizing ability even after dialysis, making it difficult to measure the enhancement due to X-ray irradiation. The dialyzed NCSs are the first and best nanostructures that produce minimal spontaneous polymerization while allowing the highest enhancement under irradiation of X-rays.

It is worth pointing out that PANI SERS spectrum may vary if NCSs were irradiated with the laser for a long time (10 min) (data not shown). However, the SERS signals were consistent under mild illuminating conditions and for a short time (<3 min). The SERS spectra were obtained by removing a broad background that spans over the whole 1100-1700 $cm^{-1}$. This background was observed before, e.g., by Mallick et al. (Mallick K et al., *Macromol. Rapid Comm.* 2005, 26, 232-235) and it is dependent of the growth condition. Finally, effects of radiation on PANI was studied in the past (Wolszczak M et al., *Rad. Phys. Chem.* 1996, 47, 859-867), which suggests that the damage to PANI to be relatively small for the amount (<25 Gy) of X-rays.

The results and concepts shown here may find a wide range of applications in the area of X-ray Nanochemistry. For instance, this will benefit polymerization-induced drug release at remote locations using highly penetrating X-rays. Remote controlled polymerization may also help create new applications in optics and semiconductor industries. Using low dose X-rays to release Ag ions may have applications in medicine, especially given the fact that Ag ions are known antimicrobials (Dair B J et al., *J. Nanosci Nanotechno* 2010, 10, 8456-8462), although a much lower dose (e.g., 0.01 Gy) of X-rays will be needed to fully take advantage of this process.

A 28-time enhancement of polymerization of aniline on Ag/Au nanocoreshells (NCSs) was achieved with X-ray irradiation at 0.6 Gy/min dose rate. The enhancement of more than 400 times was measured for polymerization of aniline under X-ray irradiation but without NCSs. The enhancement was X-ray dose rate dependent and dialyzed Ag@Au NCSs generated higher enhancement. We confirmed that SERS can be a qualitative method to determine the amount of molecules on the SERS substrate. The proposed mechanism is that X-rays first generate reactive oxidative species (ROS) that react with NCSs to form Au or Ag ionic species embedded within NCSs. This ionic complex then oxidizes aniline already absorbed on NCSs to form PANI.

EXAMPLES

Reagents were purchased from Sigma and used without further purification. Ag@Au NCSs were synthesized following a procedure by Kumar et. al. and purified with dialysis (Kumar G V P et al., *J. Phys. Chem. C.* 2007, 111, 4388-4392). Briefly, silver nanoparticles (AgNPs) were first synthesized using a 1 wt. % trisodium citrate reduction of 0.529 mM $AgNO_3$ at reflux. To form the gold shell, 6.25 mM hydroxylamine and 0.465 mM chloroauric acid were slowly added simultaneously in a dropwise fashion to a vigorously stirring solution of 12.5 mL AgNPs in 10 mL water; after addition, stirring was reduced and continues for 15 minutes. The NCS solution was transferred to a polypropylene Falcon tube and allowed to rest overnight. A 15 mL portion of the NCS solution was then dialyzed using a 10k MWCO dialysis cassette (Thermo, Slide-A-Lyzer). The dialysis bath was refreshed after the first and third hours during total dialysis time of 18 hours. Both the as-synthesized and dialyzed solution was used in a 9:1 ratio with aniline monomers for radiation experiments.

Radiation experiments were carried out in a home-built irradiation chamber housing a 65 W microfocus X-ray source (Thermo Kevex, PXS10-WB-10 mm). Samples were irradiated individually at 10-500 µA and a fixed 100 kVp. The optimum dose rate used is 50 µA which corresponded to 2.5 Gy/min to the sample volume.

SERS was performed on a home-built Raman microscope using a 780-nm diode laser (L47855-95-TE, Micro Laser Systems). The Raman signal was collected using a 63× microscope objective and an ultra-steep long pass filter (Iridian). The signal was collected via an optical fiber to a spectrometer (Spectrapro 300i, Acton Research Corp) with a liquid nitrogen cooled CCD (Spec-10, Roper Scientific). The Raman shift was calibrated against the well-known SERS spectrum of p-nitrothiophenol. Spectra were acquired at the laser power of 90 mW and an acquisition time of 3 minutes. The raw spectra of PANI growth possessed a large broad background which was removed using a spline function.

Radiation samples were prepared by combining NCS solutions with aniline monomers in a 9:1 ratio so that the concentration of aniline monomers is between 0.01 mM and 1 mM for radiation experiments. The samples were then irradiated individually. Before and after irradiation, a 25 µL aliquot was taken and aggregated by spiking 1 µL of 1 M $Na_2SO_4$ solution. SERS measurements were performed on the droplet of sample on a glass cover slip. The sample without irradiation was allowed to incubate with monomers for 10 minutes, the length of time equivalent to a 25-Gy exposure. Water and metal ion samples were prepared in a similar 9:1 ratio with monomers, but using milliQ water or $10^{-7}$-$10^{-3}$ M $Ag^+$ or $Au^{3+}$ in place of the NCS solution. Those samples were combined with NCSs for SERS after allowing monomers and ions to incubate overnight and similarly aggregated prior to acquiring SERS spectra. When investigating metal ions in addition to NCSs, metal ions and monomers were added to NCS immediately and then allowed to incubate for 10 minutes. In the case of aniline micelles, a mixture of 25-mM aniline monomers and 12.5-mM sodium dodecyl sulfate (SDS) was used. The micelle control was chemically oxidized using sodium peroxidisulfate to form PANI-micelles according to Peng et al. (Peng Z Q et al., *Langmuir* 2006, 22, 10915-10918). Radiation experiments were performed identical to that of aniline monomers shown above. Additionally, emeraldine salt and emeraldine base PANI nanofibers were synthesized chemically for use as standards following a method by Huang et al. (Huang J X et al., *J. Am. Chem. Soc.* 2004, 126, 851-855).

Atomic Absorption (Varian, SpectrAA 220FS) measurements were performed on the supernatant of a sample after centrifuging at 5000 rpm for 10 minutes to remove NCSs but retain small (<2 nm) NPs and metal ions.

Transmission electron microscopy (TEM) and scanning TEM (STEM) STEM samples were prepared by a drop-dry method. Samples were centrifuged and the soft pellets resuspended in 100% ethanol to reduce drying time and increase uniformity. TEM image (FIG. 5A) was acquired on a JEOL 1230 and STEM images (FIG. 1A, 5B, 5C) images were acquired on a JEOL 2100. FIGS. 1A and 5A are optimized contrast from the instrument computer, whereas FIGS. 5B and 5C have undergone brightness and contrast adjustments post imaging to emphasis presence or absence of small NPs near the larger NCSs.

REFERENCES (1) Zhou, H. S.; Honma, I.; Komiyama, H.; Haus, J. W. Controlled Synthesis and Quantum-Size Effect in Gold-Coated Nanoparticles. *Phys. Rev. B* 1994, 50, 12052-12056.

(2) Benfield, R. E. Mean Coordination Numbers and the Non-Metal Metal Transition in Clusters. *J. Chem. Soc. Faraday T.* 1992, 88, 1107-1110.

(3) Jones, G.; Jakobsen, J. G.; Shim, S. S.; Kleis, J.; Andersson, M. P.; Rossmeisl, J.; Abild-Pedersen, F.; Bligaard, T.; Helveg, S.; Hinnemann, B.; Rostrup-Nielsen, J. R.; Chorkendorff, I.; Sehested, J.; Norskov, J. K. First principles calculations and experimental insight into methane steam reforming over transition metal catalysts. *J. Catal.* 2008, 259, 147-160.

(4) Qu, Y. Q.; Sutherland, A. M.; Lien, J.; Suarez, G. D.; Guo, T. Probing Site Activity of Monodisperse Pt Nanoparticle Catalysts Using Steam Reforming of Methane. *J. Phys. Chem. Lett.* 2010, 1, 254-259.

(5) Freunscht, P.; Van Duyne, R. P.; Schneider, S. Surface-enhanced Raman spectroscopy of trans-stilbene adsorbed on platinum- or self-assembled monolayer-modified silver film over nanosphere surfaces. *Chem. Phys. Lett.* 1997, 281, 372-378.

(6) Alexander, K. D.; Skinner, K.; Zhang, S. P.; Wei, H.; Lopez, R. Tunable SERS in Gold Nanorod Dimers through Strain Control on an Elastomeric Substrate. *Nano Lett.* 2010, 10, 4488-4493.

(7) Carter, J. D.; Cheng, N. N.; Qu, Y. Q.; Suarez, G. D.; Guo, T. Nanoscale energy deposition by x-ray absorbing nanostructures. *J. Phys. Chem. B* 2007, 111, 11622-11625.

(8) Lee, C.; Cheng, N. N.; Davidson, R. A.; Guo, T. Geometry Enhancement of Nanoscale Energy Deposition by X-rays. *J. Phys. Chem. C* 2012, 116, 11292-11297.

(9) Cho, S. H.; Jones, B. L.; Krishnan, S. Estimation of microscopic dose enhancement factor around gold nanoparticles by Monte Carlo calculations. *Med. Phys.* 2010, 37, 3809-3816.

(10) Cheng, N. N.; Starkewolf, Z.; Davidson, A. R.; Sharmah, A.; Lee, C.; Lien, J.; Guo, T. Chemical Enhancement by Nanomaterials under X-ray Irradiation. *J. Am. Chem. Soc. Commun.* 2012, 134, 1950-1953.

(11) Foley, E.; Carter, J.; Shan, F.; Guo, T. Enhanced relaxation of nanoparticle-bound supercoiled DNA in X-ray radiation. *Chem. Commun.* 2005, 3192-3194.

(12) Carter, J. D.; Cheng, N. N.; Qu, Y. Q.; Suarez, G. D.; Guo, T. Enhanced single strand breaks of supercoiled DNA in a matrix of gold nanotubes under X-ray irradiation. *J. Colloid Interf. Sci.* 2012, 378, 70-76.

(13) Tseng, S. J.; Chien, C. C.; Liao, Z. X.; Chen, H. H.; Kang, Y. D.; Wang, C. L.; Hwu, Y.; Margaritondo, G. Controlled hydrogel photopolymerization inside live systems by X-ray irradiation. *Soft Matter* 2012, 8, 1420-1427.

(14) Gaeta, C. J.; Rieger, H.; Turcu, I. C. E.; Forber, R. A.; Campeau, S. M.; Cassidy, K. L.; Powers, M. F.; Stone, A.; Maldonado, J. R.; Mrowka, S.; French, G.; Naungayan, J.; Kelsy, C.; Hark, P.; Morris, J. H.; Foster, R. M.; Carosella, J. C.; Fleming, D.; Selzer, F.; Siegert, H.; Smith, H. I.; Lim, M. H.; Cheng, Z.; Burdett, J.; Gibson, D.; Whitlock, R. R.; Dozier, C. M.; Newman, D. A. High-power collimated laser-plasma source for proximity x-ray nanolithography. *J. Vac. Sci. & Technol. B*. 2003, 21, 280-287.
(15) Toyota, E.; Hori, T.; Khan, M.; Cerrina, F. Technique for 25 nm x-ray nanolithography. *J. Vac. Sci. & Technol. B*. 2001, 19, 2428-2433.
(16) Collinson, E.; Dainton, F. S.; Mcnaughton, G. S. The Polymerization of Acrylamide in Aqueous Solution 0.1. The X-Ray and Gamma-Ray Initiated Reaction. *T. Faraday Soc*, 1957, 53, 476-488.
(17) Kuzyk, M. G.; Sohn, J. E.; Garito, A. F. A Model for X-Ray-Induced Solid-State Polymerization. *J. Polym. Sci. Poly. Phys*. 1988, 26, 277-287.
(18) Cleland, M. R.; Galloway, R. A.; Berejka, A. J.; Montoney, D.; Driscoll, M.; Smith, L.; Larsen, L. S. X-ray initiated polymerization of wood impregnants. *Rad. Phys. Chem*. 2009, 78, 535-538.
(19) Blinova, N. V.; Stejskal, J.; Trchova, M.; Sapurina, I.; Ciric-Marjanovic, G. The oxidation of aniline with silver nitrate to polyaniline-silver composites. *Polymer* 2009, 50, 50-56.
(20) Lee, K. P.; Gopalan, A. Y.; Santhosh, P.; Lee, S. H.; Nho, Y. C. Gamma radiation induced distribution of gold nanoparticles into carbon nano tube-polyaniline composite. *Compos. Sci. Technol*. 2007, 67, 811-816.
(21) Belloni, J.; Mostafavi, M. Radiation chemistry of nanocolloids and clusters. In *Radiation Chemistry: Present Status and Future Trends;* 1st ed.; Jonah, C. D., Rao, B. S. M., Eds.; Elsevier Science, 2001; Vol. 87; pp 411-452.
(22) Merga, G.; Saucedo, N.; Cass, L. C.; Puthussery, J.; Meisel, D. "Naked" Gold Nanoparticles: Synthesis, Characterization, Catalytic Hydrogen Evolution, and SERS. *J. Phys. Chem. C*. 2010, 114, 14811-14818.
(23) Felix, J. F.; Barros, R. A.; de Azevedo, W. M.; da Silva, E. F. X-ray irradiation: A non-conventional route for the synthesis of conducting polymers. *Synthetic Metals* 2011, 161, 173-176.
(24) Cristescu, C.; Andronie, A.; Iordache, S.; Stamatin, S. N.; Constantinescu, L. M.; Rimbu, G. A.; Iordoc, M.; Vasilescu-Mirea, R.; Iordache, I.; Stamatin, I. PANi-TiO(2) nanostructures for fuel cell and sensor applications. *J. Optoelectron. Adv. M*. 2008, 10, 2985-2987.
(25) Tseng, R. J.; Baker, C. O.; Shedd, B.; Huang, J. X.; Kaner, R. B.; Ouyang, J. Y.; Yang, Y. Charge transfer effect in the polyaniline-gold nanoparticle memory system. *Appl. Phys. Lett*. 2007, 90.
(26) Gao, P.; Gosztola, D.; Weaver, M. J. Surface-Enhanced Raman-Spectroscopy as a Probe of Electroorganic Reaction Pathways 0.2. Ring-Coupling Mechanisms during Aniline Oxidation. *J. Phys. Chem*. 1989, 93, 3753-3760.
(27) Baibarac, M.; Cochet, M.; Lapkowski, M.; Mihut, L.; Lefrant, S.; Baltog, I. SERS spectra of polyaniline thin films deposited on rough Ag, Au and Cu. Polymer film thickness and roughness parameter dependence of SERS spectra. *Synthetic Met*. 1998, 96, 63-70.
(28) Dong, X.; Gu, H. M.; Liu, F. F. Study of the surface-enhanced Raman spectroscopy of residual impurities in hydroxylamine-reduced silver colloid and the effects of anions on the colloid activity. *Spectrochim. Acta A* 2012, 88, 97-101.
(29) Qi, Y. J.; Hu, Y. J.; Xie, M.; Xing, D.; Gu, H. M. Adsorption of aniline on silver mirror studied by surface-enhanced Raman scattering spectroscopy and density functional theory calculations. *J. Raman Spectrosc*. 2011, 42, 1287-1293.
(30) Billman, J.; Otto, A. Charge-Transfer between Adsorbed Cyanide and Silver Probed by Sers. *Surf Sci*. 1984, 138, 1-25.
(31) Huang, J. X.; Kaner, R. B. A general chemical route to polyaniline nanofibers. *J. Am. Chem. Soc*. 2004, 126, 851-855.
(32) Kittler, S.; Greulich, C.; Diendorf, J.; Koller, M.; Epple, M. Toxicity of Silver Nanoparticles Increases during Storage Because of Slow Dissolution under Release of Silver Ions. *Chem. Mat*. 2010, 22, 4548-4554.
(33) El Omar, A. K.; Schmidhammer, U.; Jeunesse, P.; Larbre, J. P.; Lin, M. Z.; Muroya, Y.; Katsumura, Y.; Pernot, P.; Mostafavi, M. Time-Dependent Radiolytic Yield of OH center dot Radical Studied by Picosecond Pulse Radiolysis. *J. Phys. Chem. A*. 2011, 115, 12212-12216.
(34) Nowicka, A. M.; Hasse, U.; Hermes, M.; Scholz, F. Hydroxyl Radicals Attack Metallic Gold. *Angew. Chem. Int. Edit*. 2010, 49, 1061-1063.
(35) Mallick, K.; Witcomb, M. J.; Dinsmore, A.; Scurrell, M. S. Polymerization of aniline by auric acid: Formation of gold decorated polyaniline nanoballs. *Macromol. Rapid Comm*. 2005, 26, 232-235.
(36) Wolszczak, M.; Kroh, J.; AbdelHamid, M. M. Effect of ionizing radiation on polyaniline solutions. *Rad. Phys. Chem*. 1996, 47, 859-867.
(37) Dair, B. J.; Saylor, D. M.; Cargal, T. E.; French, G. R.; Kennedy, K. M.; Casas, R. S.; Guyer, J. E.; Warren, J. A.; Kim, C. S.; Pollack, S. K. The Effect of Substrate Material on Silver Nanoparticle Antimicrobial Efficacy. *J. Nanosci Nanotechno* 2010, 10, 8456-8462.
(38) Kumar, G. V. P.; Shruthi, S.; Vibha, B.; Reddy, B. A. A.; Kundu, T. K.; Narayana, C. Hot spots in ag core-au shell nanoparticles potent for surface-enhanced Raman scattering studies of biomolecules. *J. Phys. Chem. C*. 2007, 111, 4388-4392.
(39) Peng, Z. Q.; Guo, L. M.; Zhang, Z. H.; Tesche, B.; Wilke, T.; Ogermann, D.; Hu, S. H.; Kleinermanns, K. Micelle-assisted one-pot synthesis of water-soluble polyaniline-gold composite particles. *Langmuir* 2006, 22, 10915-10918.

We claim:

1. A nanomaterial composition comprising a metal-based nanoparticle and a polyaniline polymer, wherein the metal-based nanoparticle comprises a core and a shell, wherein the core comprises a first metal and the shell comprises a second metal, wherein the first metal and the second metal are different metals, wherein the polyaniline polymer is in contact with the metal-based nanoparticle shell, wherein the metal-based nanoparticle has been dialyzed, and wherein the metal-based nanoparticle is a particle having a greatest dimension between 5 and 100 nanometers.

2. The nanomaterial of claim 1, wherein at least one of the first metal and the second metal comprises a metal selected from the group consisting of Ag, Au, Cu, Co, Ni, Fe, Pd, and combinations thereof.

3. The nanomaterial of claim 1, wherein the core comprises Ag.

4. The nanomaterial of claim 1, wherein the shell comprises Au.

5. The nanomaterial of claim 4, wherein the polyaniline polymer is an emeraldine salt or an emeraldine base.

6. The nanomaterial of claim 5, wherein the polyaniline polymer is an emeraldine base.

7. The nanomaterial of claim 1, wherein the metal-based nanoparticle comprises at least one nanoparticle having a core or a shell comprising Ag and at least one nanoparticle having a core or a shell comprising Au.

8. The nanomaterial of claim 1, wherein the polyaniline polymer is a poly-alkane-aniline or a poly-dianiline polymer.

9. The nanomaterial composition of claim 1, wherein the nanomaterial composition is an X-ray dosed nanomaterial composition, and wherein the X-ray dose is about 0.6 Gy/min.

* * * * *